(12) United States Patent
McGuckin et al.

(10) Patent No.: US 7,036,860 B1
(45) Date of Patent: May 2, 2006

(54) AUTOMOTIVE REAR LOAD FLOOR

(75) Inventors: John McGuckin, Ann Arbor, MI (US); Philip Leonetti, Northville, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 124 days.

(21) Appl. No.: 10/976,333

(22) Filed: Oct. 29, 2004

(51) Int. Cl.
*B62D 43/10* (2006.01)

(52) U.S. Cl. .............. 296/37.2; 296/37.14; 296/193.07

(58) Field of Classification Search ............ 296/37.14, 296/37.2, 37.3, 37.1, 193.07, 187.08
See application file for complete search history.

(56) References Cited

U.S. PATENT DOCUMENTS

| | | | |
|---|---|---|---|
| 5,042,837 A | 8/1991 | Kleinschmit | 280/784 |
| 5,195,795 A | 3/1993 | Cannera | 296/65.09 |
| 5,346,275 A * | 9/1994 | Enning et al. | 296/37.2 |
| 5,364,128 A | 11/1994 | Yoshikazu | 280/784 |
| 5,799,845 A * | 9/1998 | Matsushita | 296/37.2 |
| 5,890,758 A | 4/1999 | Pone | 297/15 |
| 5,979,962 A * | 11/1999 | Valentin et al. | 296/37.1 |
| 6,003,921 A * | 12/1999 | Tozuka | 296/37.2 |
| 6,106,046 A | 8/2000 | Reichel | 296/65.09 |
| 6,502,886 B1 * | 1/2003 | Bleau et al. | 296/37.2 |
| 6,655,896 B1 * | 12/2003 | Morin et al. | 296/37.2 |
| 2003/0102687 A1 * | 6/2003 | McLeod et al. | 296/37.2 |
| 2004/0262934 A1 * | 12/2004 | Harima et al. | 296/37.2 |

* cited by examiner

*Primary Examiner*—Jason Morrow
(74) *Attorney, Agent, or Firm*—Gigette M. Bejin; Miller Lawgroup

(57) ABSTRACT

A rear load floor is formed with a first recessed storage well for holding cargo within the rear cargo area of the automobile. A second recessed storage well is formed in the floor of the first recessed storage well to store the spare tire and jack assembly. A removable panel is provided to cover the spare tire recessed well and maintain the integrity of the bottom of the first recessed storage well for the loading of cargo thereon. The second recessed storage well is positioned off center with respect to the longitudinal centerline of the vehicle to accommodate the mounting of the vehicle exhaust system. The first recessed storage well includes a flange located at the conventional load floor position and supported from the rear side rails of the vehicle body.

17 Claims, 6 Drawing Sheets

AUTOMOTIVE REAR LOAD FLOOR

BACKGROUND OF THE INVENTION

Automobiles are provided with a rear load floor in the cargo area supported on chassis frame members commonly referred to as rear side rails. Typically, the level of the load floor is defined by a weld flange supported on the rear side rails such that the load floor is supported on the weld flange or on top of the rear side rails. Some automobiles incorporate a recessed spare tire well within a central location on the rear load floor in order to store a spare tire and jack assembly for the automobile. It would be desirable to provide a rear load floor configuration that would increase cargo carrying capacity of the cargo area.

An example of a recessed well for storage capability can be found in U.S. Pat. No. 5,042,837, issued to Einhard Kleinschmit, et al on Aug. 27, 1991, in which the rear cargo area is formed with a recessed well in which the spare tire is stored. Typically, a removable panel is placed on top of the spare tire well so that the load floor is a relatively flat contiguous surface on which cargo can be placed without dropping into the spare tire well.

Another usage of a well recessed below a load floor level can be seen in U.S. Pat. No. 5,195,795, issued to Raymond Cannera, et al on Mar. 23, 1993, in which the recessed well is utilized to store a folded seat such that the seat is retractable below the surface of the load floor. In such a configuration, the rear surface of the seat back can be the extension of the load floor. In the Cannera patent, a pivotable load floor panel is movable to permit the receipt of the folded seat before being re-positioned to a contiguous position against the load floor.

In U.S. Pat. No. 5,364,128, issued to Yoshikazu Ide on Nov. 15, 1994, the recessed well for storage of the spare tire is positioned immediately below the load floor, which is conventionally positioned at the rear side rails. The Ide spare tire well is off center with respect to the longitudinal center line of the automobile to accommodate the exhaust system of the automobile.

Similarly, U.S. Pat. No. 5,890,758, issued to Victor Pone, et al on Apr. 6, 1999, depicts a recessed spare tire well immediately below the load floor which supports a rearwardly facing seat in a minivan configuration. As an expansion of the concept depicted in the Cannera patent, U.S. Pat. No. 6,106,046, issued to Anton Reichel on Aug. 22, 2000, the recessed well serves to provide storage of both a spare tire and the folded rear seat of the automobile.

All of the above-described prior art depicts the conventional load floor configuration forming a generally planar member with a recessed storage well formed therein to be covered by a removable lid that is generally contiguous with the load floor.

SUMMARY OF THE INVENTION

It is an object of this invention to overcome the aforementioned disadvantages of the known prior art by providing a rear load floor in which the floor is formed with a recessed cargo well below which is a second recessed spare tire storage well.

It is another object of this invention to provide a rear load floor configuration that increases volume in the cargo area of the vehicle.

It is a feature of this invention that the load floor is provided with two recessed wells.

It is an advantage of this invention that the recessed cargo well increases cargo volume for the cargo area of a vehicle when compared to a conventional planar load floor.

It is another advantage of this invention that the bottom of the recessed spare tire storage well is positioned at the ground line of the vehicle.

It is another feature of this invention that the recessed spared tire storage well is located off center with respect to the longitudinal centerline of the vehicle.

It is yet another advantage of this invention that the off center spare tire storage well accommodates the mounting of the exhaust system of the vehicle to one side of the recessed well.

It is still another advantage of this invention that the load floor configuration with two recessed storage wells permits the formation of ribs to strengthen the load floor and to favorably define vibrational harmonics.

It is a further object of this invention to provide a rear load floor configuration for the cargo area of an automotive that is durable in construction, inexpensive of manufacture, carefree of maintenance, facile in assemblage, and simple and effective in use.

These and other objects, features and advantages are accomplished according to the instant invention by providing a rear load floor in which the load floor is formed with a first recessed storage well for holding cargo within the rear cargo area of the automobile. A second recessed storage well is formed in the floor of the first recessed storage well to store the spare tire and jack assembly. A removable panel is provided to cover the spare tire recessed well and maintain the integrity of the bottom of the first recessed storage well for the loading of cargo thereon. The second recessed storage well is positioned off center with respect to the longitudinal centerline of the vehicle to accommodate the mounting of the vehicle exhaust system. The first recessed storage well includes a flange located at the conventional load floor position and supported from the rear side rails of the vehicle body.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
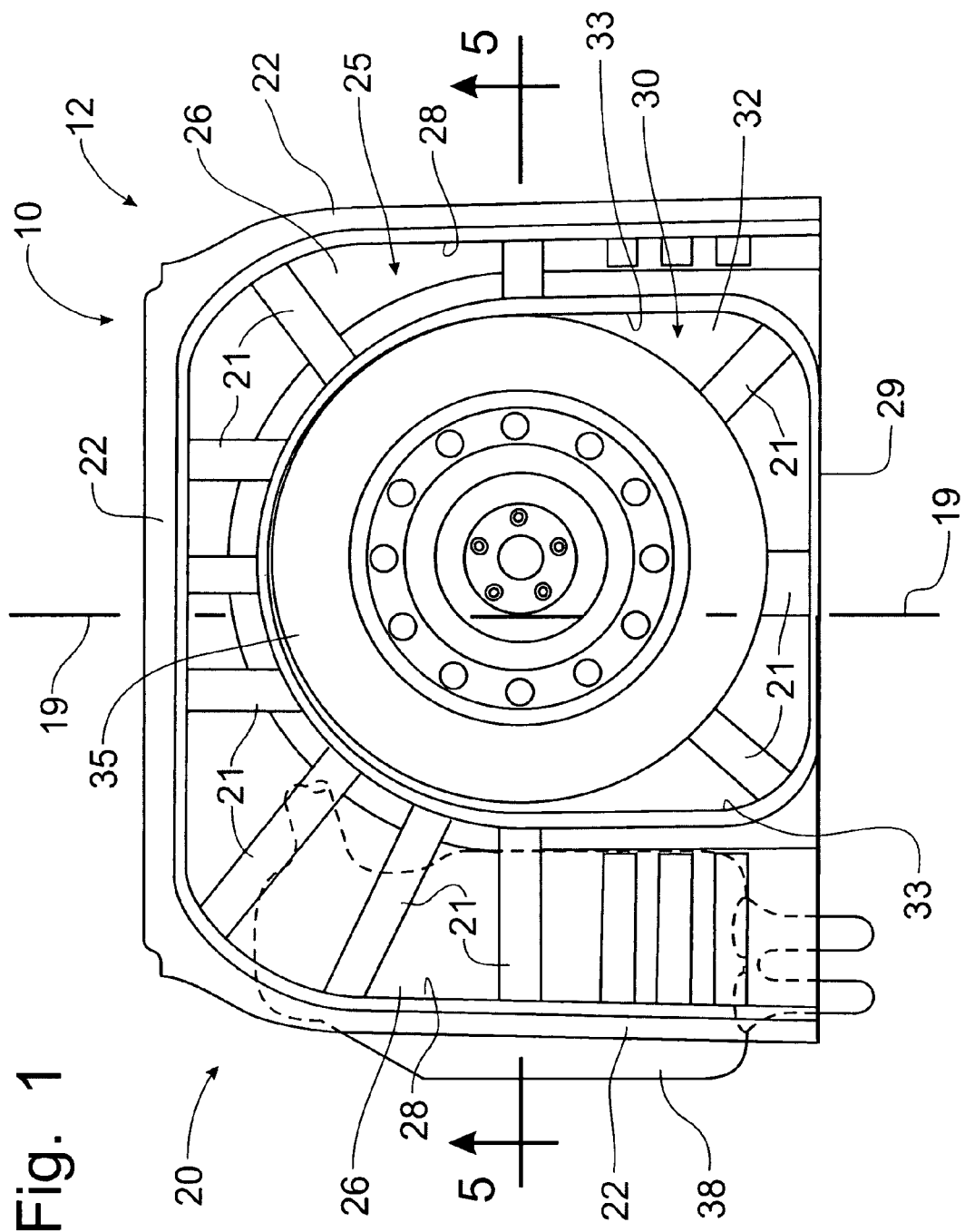
FIG. 1 is a top plan view of the rear load floor in an automotive cargo area incorporating the principles of the instant invention, the remaining portions of the automobile being broken away for purposes of clarity.
Figure 2:
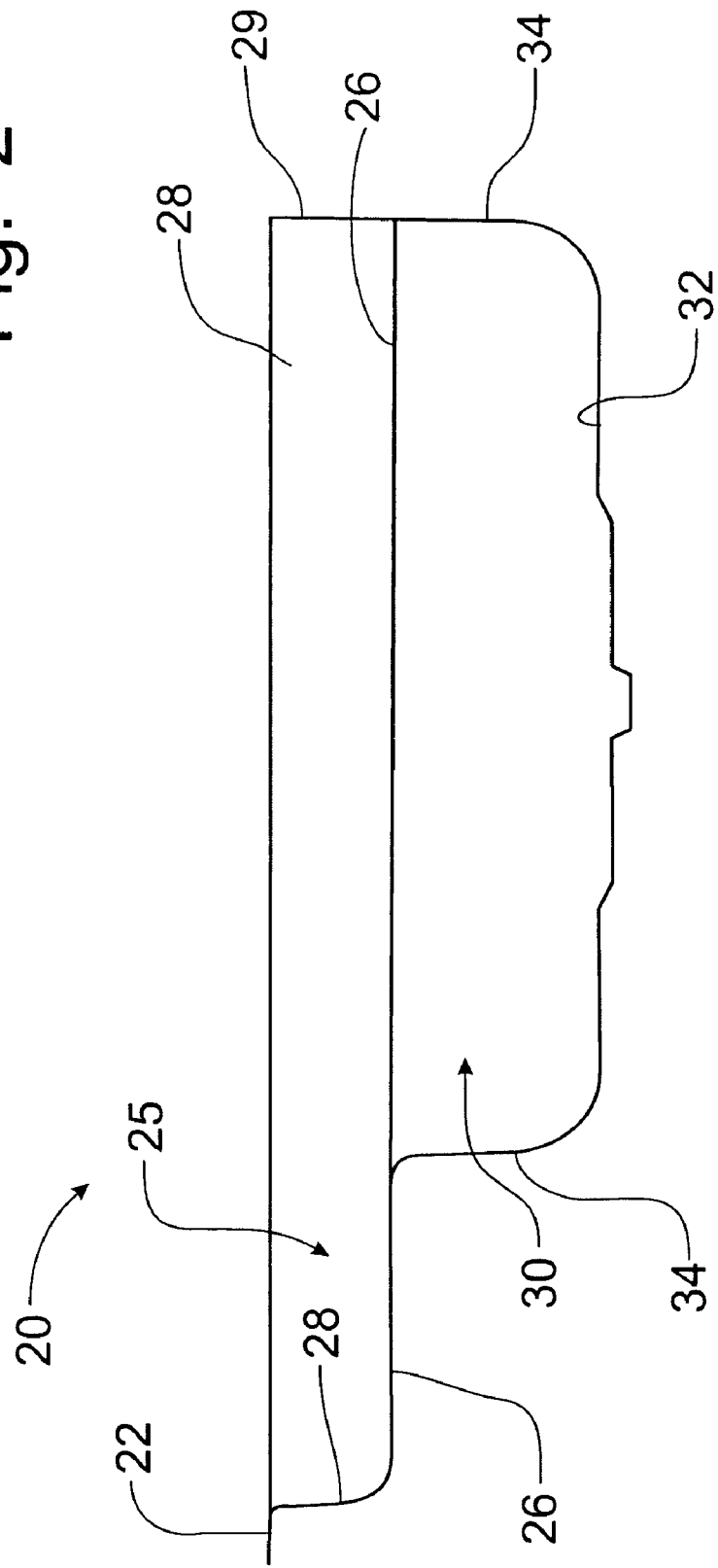
FIG. 2 is a right side elevational view of the rear load floor depicted in FIG. 1.
Figure 3:
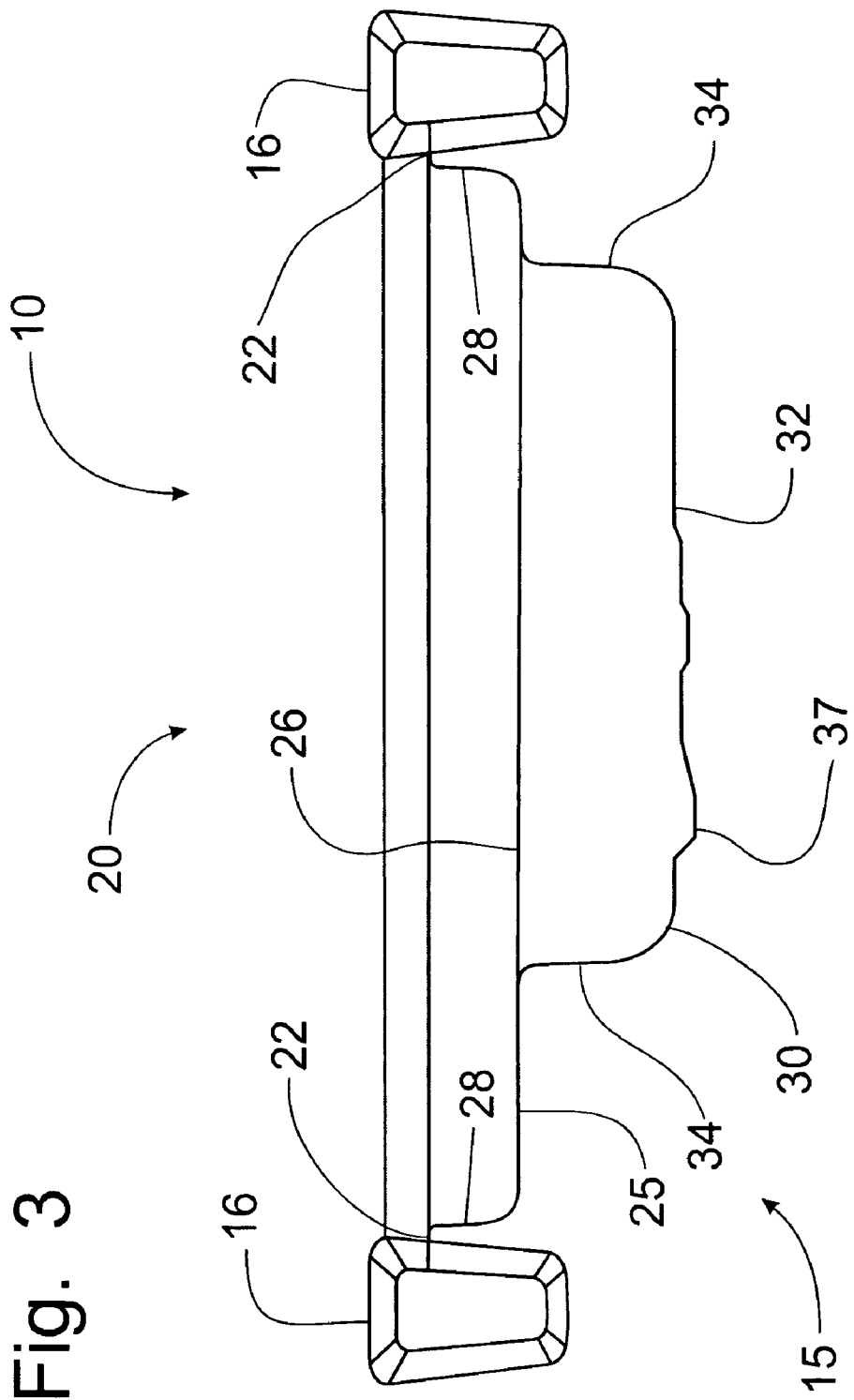
FIG. 3 is a rear elevational view of the rear load floor depicted in FIG. 1.
Figure 4:
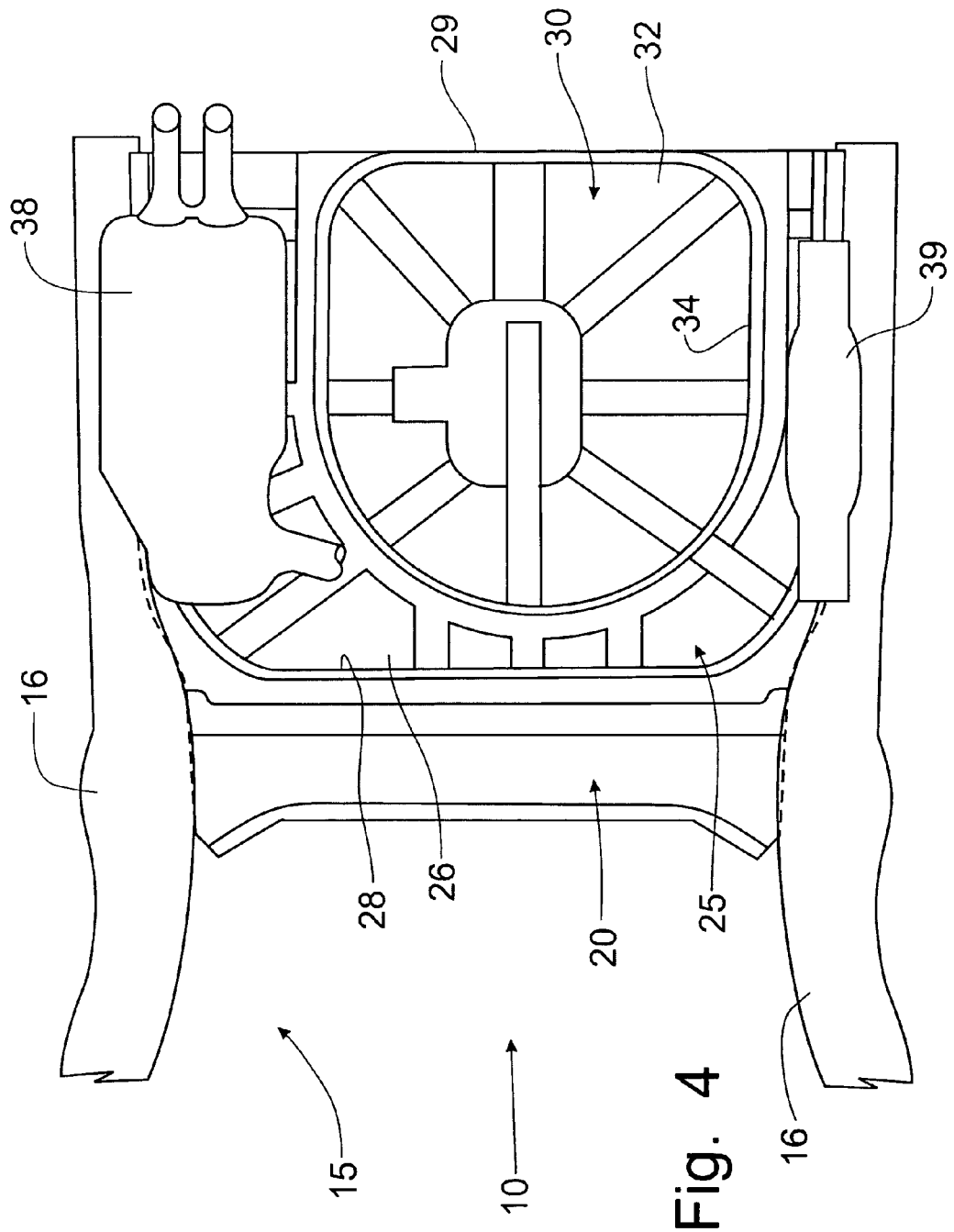
FIG. 4 is a bottom plan view of the rear load floor depicted in FIG. 1, but showing the location of the exhaust system and pollution control equipment.

Referring to the drawings, a rear cargo area 12 of an automobile 10 incorporating the principles of the instant invention can best be seen. The rear load floor 20 forms the floor portion of the cargo area 12, which typically forms the trunk of a conventional sedan automobile. The principles of the instant invention are best applied to vehicles with an enclosed trunk forming the cargo area 12 of the automobile 10, but are also adaptable to other forms of automobiles 10.

The frame 15 of the automobile 10 is formed with rearwardly extending rear side rails 16 that are laterally spaced on opposite sides of the longitudinal centerline 19 of the vehicle 10. The rear side rails 16 will have attached thereto a mounting bracket 17 on which the load floor 20 will be affixed, such as by welding. In conventional vehicles, the load floor will extend generally horizontally across the cargo area 12 mounted directly to the tops of the rear side rails 16. The volume of the cargo area 12 for the vehicle trunk is defined by the enclosed space above the load floor.

As depicted in the drawings, the instant invention forms the load floor 20 with a first recessed well 25 that has a generally horizontal flange 22 extending around the recessed well 25, except for along the rear edge which abuts the rear wall of the trunk. The horizontal flange 22 is welded to the rear side rails 16 at the conventional location for the prior art planar load floor. The first recessed storage well 25 is then formed with a bottom floor 26 and an upright wall 28 interconnecting the bottom floor 26 and the horizontal flange 22.

Figure 5:
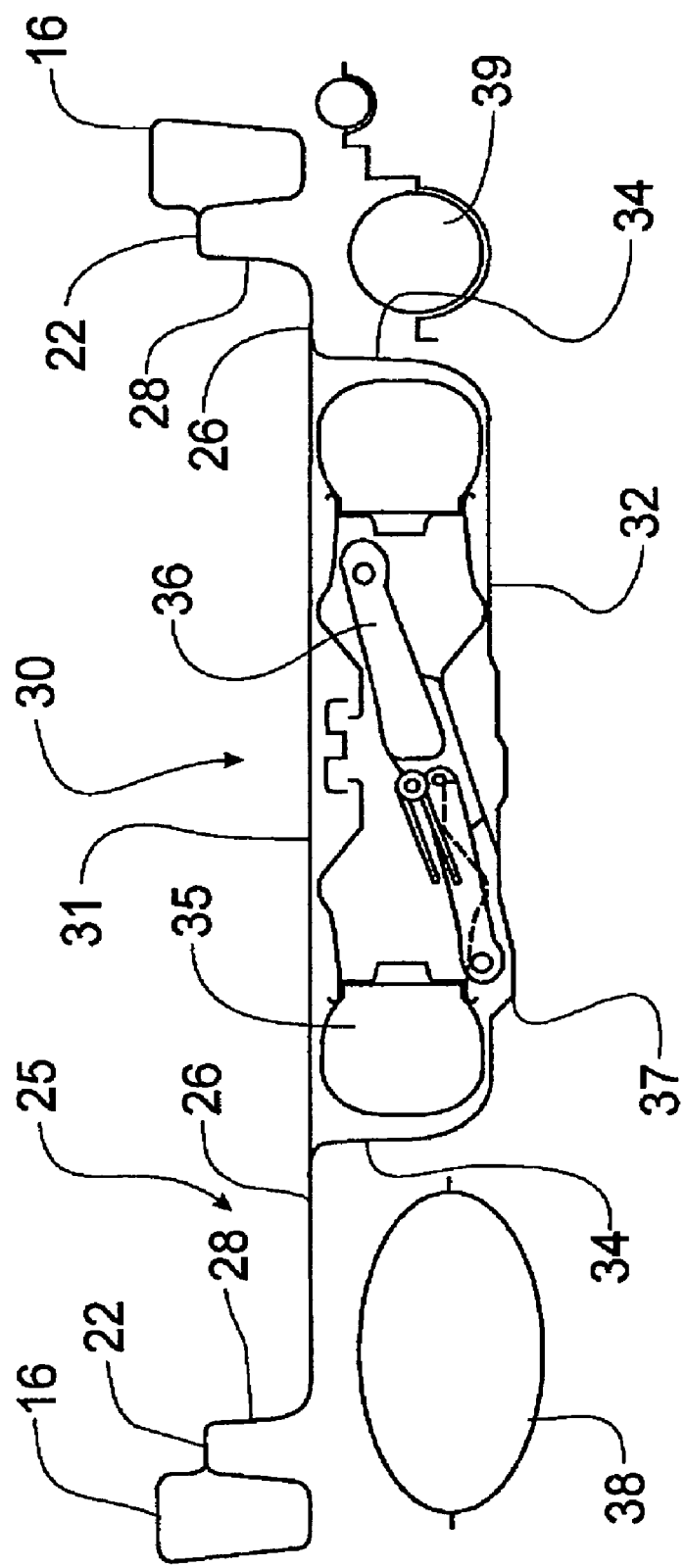
FIG. 5 is a schematic cross-sectional profile of the rear load floor corresponding to lines 5—5 of FIG. 1.
Figure 6:
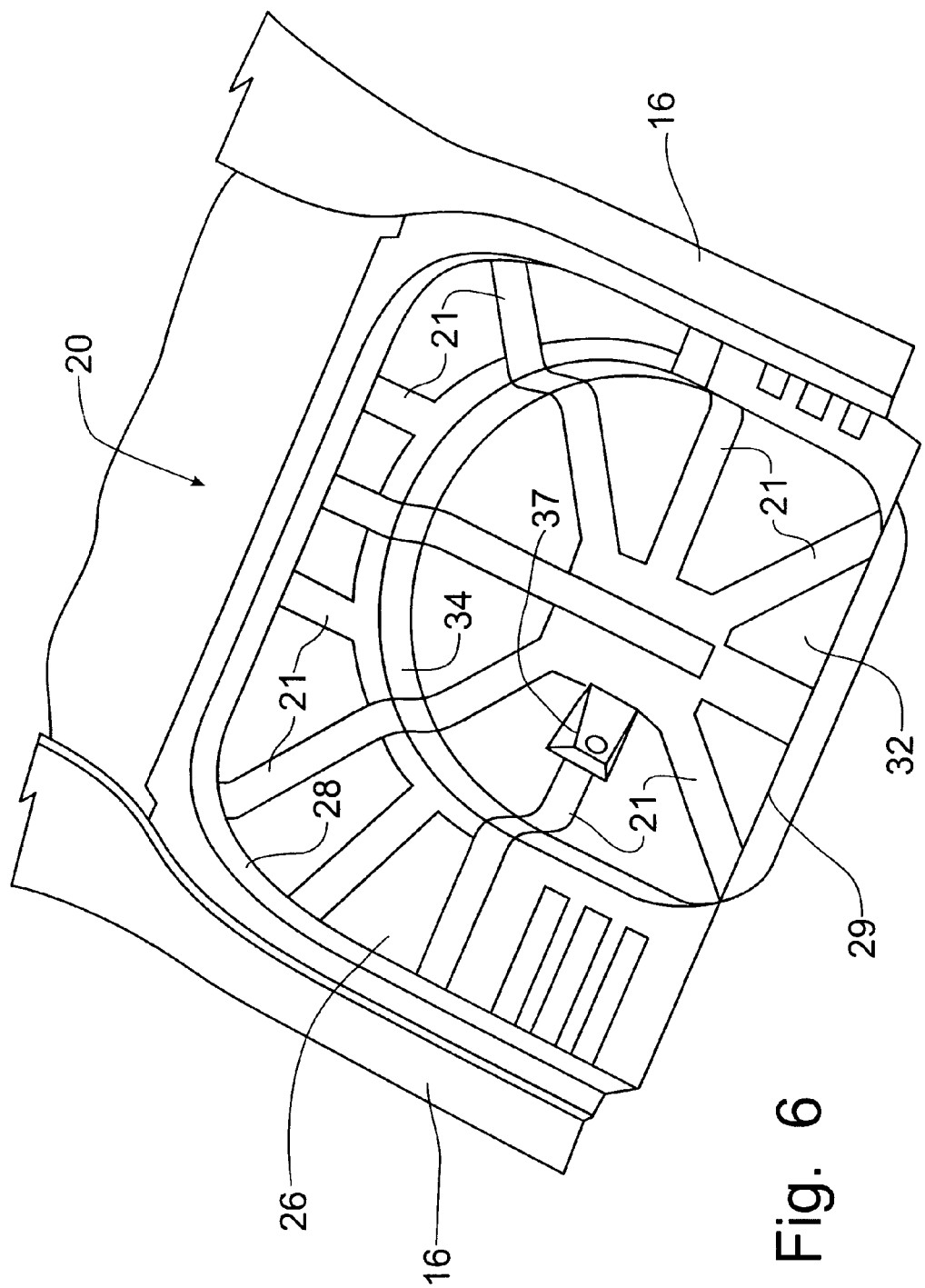
FIG. 6 is upper, right rear perspective view of the rear load floor.

A second recessed storage well 30 is then formed into the bottom floor 26 of the first recessed storage well 25 and has a bottom floor member 32 and an upright circumferential wall 34 interconnecting the bottom floor 26 of the first recessed storage well 25 and the bottom floor 32 of the second recessed storage well 30. This second recessed storage well 30 is used to mount the jack assembly 36 and to house the spare tire 35 in a generally conventional manner. The bottom floor 32 of the second recessed storage well 30 is formed to support the conventional mounting devices for restraining the jack assembly 36 and the spare tire 35. A conventional removable cover panel 31, as is best seen schematically in FIG. 5, can be used to cover the second recessed storage well 30 to hide the spare tire 35 from view under normal conditions where only the cargo area 12 is needed for access. The removable cover panel would be contiguous with the bottom floor of the first recessed storage well 25 to define the lower perimeter of the cargo area 12.

The generally horizontal surfaces of the first and second recessed storage wells 25, 30 are preferably formed with dampening ribs 21 that are specifically designed to change the harmonics of the load floor 20 so as to not correspond to the natural harmonic vibrations of the automobile 10 or any component thereof. The design and placement of such dampening ribs is well known in the art and are used to keep the noise level of the operating vehicle to acceptable levels. The bottom floor 32 of the second recessed storage well 30 is located substantially at the ground line for the vehicle, i.e. the lowest point of the vehicle 10 above the surface of the ground to allow a minimum clearance for the vehicle 10.

As is best seen in FIGS. 1 and 4–6, the second recessed storage well 30 is not centrally located with respect to the longitudinal centerline 19 of the automobile 10. The second recessed storage well 30 is offset toward one side of the longitudinal centerline 19 to accommodate the passage of the exhaust system 38 to one side of the second recessed storage well. Similarly, the pollution control system 39 of the vehicle 10 can be passed to the opposite of the second recessed storage well 30 because the pollution control system 39 requires less room than the vehicle exhaust system 38. The first recessed storage well 25, however, is substantially centralized in the cargo area 12 to keep a generally uniform flange 22 around the edge of the upright wall 32 for welding support of the load floor 20, except for the rearward edge 29.

In operation, the first recessed storage well 25 significantly increases the storage volume of the cargo area 12 by an amount equal to the volume of the first recessed storage well 25, which is recessed below the conventional level of the load floor 20. The second recessed storage well 30 is covered by the removable cover panel (not shown) to hide the spare tire 35 from view. Thus, a tub-in-tub load floor 20 is formed according to the principles of the instant invention.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an automobile having a rear cargo area supported by a frame including rear side rails, an improved rear load floor comprising:
    a first recessed storage well having a bottom pan and an upright wall formed in said load floor for the storage of cargo; and
    a second recessed storage well formed in said bottom pan of said first recessed storage well for the storage of a spare tire for said automobile, said bottom pan of said second recessed storage well being located at a ground line of said automobile.

2. The automobile of claim 1 wherein said second recessed storage well is off center with respect to a longitudinal centerline of said automobile.

3. The automobile of claim 2 wherein said second recessed storage well includes a bottom pan and an upright wall extending around said bottom pan, said automobile further comprising a removable lid covering said second recessed storage well to be generally contiguous with said bottom pan of said first recessed storage well.

4. The automobile of claim 1 wherein said first recessed storage well includes a generally horizontal flange connectable to said frame.

5. The automobile of claim 4 wherein said second recessed storage well has a generally circular portion to correspond to said spare tire.

6. A rear cargo load floor supportable from rear side rail frame rails in an automotive vehicle comprising:
    a generally horizontal flange portion connectable to said rear side frame rails;
    a first recessed storage well contiguous with said flange portion and having a floor member and a first upright wall interconnecting said floor member and said flange, said floor member being oriented generally parallel to said flange portion and offset vertically below said flange portion; and
    a second recessed storage well formed in said floor member and having a bottom pan and a second upright wall interconnecting said bottom pan and said floor member, said bottom pan being oriented generally parallel to and offset vertically from said floor member.

7. The rear cargo load floor of claim 6 wherein said second recessed storage well is offset transversely with respect to a longitudinal centerline of said rear cargo load floor.

8. The rear cargo load floor of claim 7 wherein said second recessed storage well is sized to receive a spare tire for said automotive vehicle.

9. The rear cargo load floor of claim 8 wherein said second recessed storage well has a circular component to correspond to said spare tire.

10. The rear cargo load floor of claim 9 further comprising a cover panel for said second recessed storage well, said cover panel being positionable over said bottom pan to be generally contiguous with said floor member.

11. The rear cargo load floor of claim 7 wherein said first recessed storage well has a rectangular configuration with said generally horizontal flange portion being formed on three sides thereof.

12. The rear cargo load floor of claim 11 wherein said first recessed storage well has a rear side that is connected to a generally vertical cargo area wall member against which said flange portion abuts.

13. A method of increasing the volume of a cargo area in an automotive vehicle, said cargo area having a load floor defining a lower perimeter of said cargo area, comprising the steps of:

forming a first recessed storage well into said load floor, said first recessed storage well having a floor member and an upright wall member into said load floor, said floor member being positioned generally parallel to and spaced vertically below said load floor, said load floor being reduced to a horizontal flange contiguous with said upright wall; and creating a second recessed storage well in said floor member of said first storage well, said second recessed storage well including a bottom pan located generally parallel to and spaced vertically below said floor member and a second upright wall interconnecting said bottom pan and said floor member, said second recessed storage well being positioned off center with respect to said first recessed storage well.

14. The method of claim 13 wherein said horizontal flange is connected to rear side rails of said automotive vehicle.

15. The method of claim 14 wherein said creating step includes the step of configuring said second recessed storage well to store a spare tire for said automotive vehicle.

16. The method of claim 15 wherein said configuring step also permits the storage of a jack assembly with said spare tire.

17. The method of claim 16 wherein said horizontal flange is welded to said rear side rails with generally horizontally oriented welds.

* * * * *